United States Patent [19]

Yoshikawa et al.

[11] Patent Number: 5,348,991
[45] Date of Patent: Sep. 20, 1994

[54] AQUEOUS DISPERSION COATING COMPOSITION

[75] Inventors: Motoyoshi Yoshikawa, Yamatotakada; Hideyoshi Noda, Nishinomiya; Shinsuke Shirakawa, Suita; Noriyuki Tsuboniwa, Higashiosaka; Eiji Yamanaka, Suita; Satoshi Urano, Tsuzuki; Kazunori Kanda, Yao, all of Japan

[73] Assignee: Nippon Paint Co., Ltd., Osaka, Japan

[21] Appl. No.: 895,427

[22] Filed: Jun. 5, 1992

Related U.S. Application Data

[63] Continuation of Ser. No. 567,294, Aug. 14, 1990, abandoned.

[30] Foreign Application Priority Data

Aug. 17, 1989 [JP] Japan .................................. 1-213227

[51] Int. Cl.$^5$ .................................................. C08L 55/00
[52] U.S. Cl. ........................................... 523/402; 524/502; 524/504; 524/506; 524/513; 524/514; 524/521; 524/547; 524/555; 526/304
[58] Field of Search ............... 524/521, 547, 555, 502, 524/504, 506, 513, 514; 523/402; 526/304

[56] References Cited

U.S. PATENT DOCUMENTS

| | | | |
|---|---|---|---|
| 4,816,537 | 3/1989 | Tsubiniwa | 526/301 |
| 4,935,413 | 6/1990 | Urano | 514/178 |

FOREIGN PATENT DOCUMENTS

| | | |
|---|---|---|
| 0206544 | 12/1986 | European Pat. Off. . |
| 0243160 | 10/1987 | European Pat. Off. . |
| 2197025 | 3/1974 | France . |

OTHER PUBLICATIONS

Encyclopedia of Polymer Science and Engineering, vol. 17, Wiley, 1989, New York, pp. 234–235.
Hawley's Consensed Chemical Dictionary, 11th Ed, Von Nestrand Reinhold, New York, 1987, pp. 496, 622.

*Primary Examiner*—Mark Nagumo
*Attorney, Agent, or Firm*—Wenderoth, Lind & Ponack

[57] ABSTRACT

An aqueous dispersion coating composition comprising at least one kind of resin, wherein any one of said resin or resins has at least one functional group selected from an active hydrogen-containing group, a substituted acylamide group and a water dispersible or water-soluble group, and wherein the resin composition as a whole contains each of the above described kinds of functional groups.

8 Claims, No Drawings

AQUEOUS DISPERSION COATING COMPOSITION

This application is a continuation of now abandoned application, Ser. No. 07/567,294, filed Aug. 14, 1990.

FIELD OF THE INVENTION

The present invention relates to an aqueous dispersion coating composition, in particular to a one-pack aqueous dispersion coating composition which is stable at ambient temperature.

BACKGROUND OF THE INVENTION

A compound having a reactive substituted acylamide group and a polymerizable carbon-carbon double bond, i.e. a substituted acylamide compound represented by the following formula (1), is known to the art, as a compound which achieves crosslinking reaction (Japanese Kokai Specification No. 275259/1986);

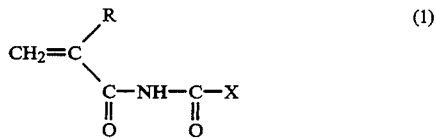

(1)

wherein R represents a hydrogen atom or a lower alkyl group, and X represents an alkoxy group, an amino group, an amide group, an iminooxy group or a sulfide group, which may be substituted with other groups.

Polymers which contain both an active hydrogen and a substituted acylamide group, prepared by polymerizing the above described substituted acylamide compounds with active hydrogen-containing ethylenic unsaturated compounds, have also been proposed in Japanese Kokai Specification No. 46207/1988. In addition, there has been proposed a water dispersible resin which is obtained by polymerizing the above described substituted acylamide compounds with acidic group- or basic group-containing ethylenic unsaturated compounds (see Japanese Kokai Specification No. 46203/1988).

Further studies have been conducted on applications of the polymer prepared from the substituted acylamide compounds to paint.

SUMMARY OF THE INVENTION

The present invention provides an aqueous dispersion coating composition comprising at least one kind of resin, wherein any one of said resin or resins has at least one functional group consisting of an active hydrogen-containing group, a substituted acylamide group and a water dispersible or water-soluble group, and wherein the resin composition as a whole contains each of the above described kinds of functional groups.

DETAILED DESCRIPTION OF THE PRESENT INVENTION

According to the present invention, it is essential that a substituted acylamide group, an active hydrogen-containing group and a water dispersible or water soluble group are present in the resinous components of the coating compositions. Accordingly, the above described three kinds of the functional groups may be all contained in one resin. In addition, the above described three kinds of the functional groups may be contained in different resins, that is three kinds of resins. Furthermore, a composition where any two kinds of the functional groups are present in the one kind of the resins and the remaining functional group is present in another kind of the resins, is within the scope of the present invention. Besides, the one functional group, for example the substituted acylamide group, may be contained in at least two kinds of the resins.

The active hydrogen-containing group of the present invention includes a carboxyl group, a hydroxyl group, an amino group, a thiol group, a sulfonic acid group and the like. The water dispersible or water soluble group includes anionic groups (e.g. a carboxyl group, a sulfonic acid group and a phosphic acid group), cationic groups (e.g. an onium group), nonionic groups (e.g. an adduct of ethylene oxide), amphoteric groups and mixtures thereof.

The vinyl polymers used for the coating composition according to the present invention can be synthesized by polymerizing the substituted acylamide compounds (I) through carbon-carbon double bonds.

Monomers used for the synthesis include active hydrogen group-containing ethylenic unsaturated compounds, ethylenic unsaturated compounds having a water dispersible or water soluble group and, if necessary, ethylenic unsaturated compounds without such functional groups. The polymerization conditions of these monomeric compounds can be greatly varied in accordance with monomers used in the polymerization, polymerization degree and the like.

The active hydrogen-containing ethylenic unsaturated compounds include unsaturated acids (for example, acrylic acid, methacrylic acid, crotonic acid, cinnamic acid, 2-isopropylacrylic acid, trans-2-decenoic acid, cis-2-decenoic acid, α-chloroacrylic acid, β-transnitroacrylic acid, isocrotonic acid, 2-pentenoic acid, 2-ethylacrylic acid, tiglic acid, 3,3-dimethylacrylic acid, propylacrylic acid, itaconic acid, 2-methyl-3-ethylacrylic acid, 2-ethylcrotonic acid, maleic acid, trimethylacrylic acid, butylacrylic acid, 2-methyl-2-hexenoic acid, 3-methyl-3-propylacrylic acid, 2,3-diethylacrylic acid, 4-methyl-2-hexenoic acid, 3,3-diethylacrylic acid, 3-tert-butylacrylic acid, 2,3-dimetyl-3-ethylacrylic acid, 3-methyl-isopropylacrylic acid, 2-octenoic acid, 2-pentylacrylic acid, 2-butylcrotonic acid, 2-nonenoic acid, 2-hexylacrylic acid and 4-ethyl-2-octenoic acid), unsaturated alcohols (for example, monoesters of the above described unsaturated acids and glycols (such as, ethylene glycol and propylene glycol), crotonic alcohol, cinnamyl alcohol and o-hydroxystyrene), unsaturated amides (for example, acrylamide, methacrylamide, crotonamide, cinnamamide, p-benzamidestyrene, methylacrylamide, glycolate-metyl ether and methacrylamide propanesulfonic acid), unsaturated sulfonic acids or salts thereof (for example, 2-sulfoethyl acrylate, 2-sulfoethyl methacrylate, t-butylacrylamidesulfonic acid, 4-sulfophenyl acrylate and p-vinylbenzenesulfonic acid), unsaturated phosphoric acids (for example, acidphosphoxyethyl methacrylate, 3-chloro-2-amidephosphoxypropyl methacrylate, acidphosphoxypropyl methacrylate, vinylphosphate and isopropenyl phosphate) and the like. These may be used singly or in combination.

Those monomers having ionic groups, that is acidic groups or basic groups (for example a carboxylic group, a sulfonic acid group, a phosphoric acid group or an onium group), of the above described active hydrogen-containing ethylenic unsaturated compounds are used as the ethylenic unsaturated compounds giving a water dispersible or water soluble group. The water dispersible or water soluble groups are neutralized with counter ionic compounds (that is, the acidic groups with the basic groups, the basic groups with the acidic groups).

The vinyl polymers used in the present invention are polymerized from the above described three kinds of monomer but other monomers without the above described functional groups may be used, if necessary. They include monoolefins and diolefins (for example, styrene, α-methylstyrene, α-ethylstyrene, isobutylene, 2-methylbutene-1, 2-methylpentene-1, 2,3-dimetylbutene-1, 2,3-dimethylpentene-1, 2,4-dimethylpentene-1, 2,3,3-trimethyl-heptene-1, 2,3-dimethylhexene-1, 2,4-dimethyl-hexene-1, 2,5-dimethylhexene-1, 2-methyl-3-ethylpentene-1, 2,3,3-trimethylpentene-1, 2,3,4-trimethylpentene-1, 2,3,4-trimethyl-pentene-1,2-methyloctene-1, 2,6-dimethylheptene-1, 2,6-dimethyloctene-1, 2,3-dimethyldecene-1, 2-methylnonadecene-1, ethylene, propylene, butylene, amylene, hexylene, butadiene-1,3 and isoprene), halogenated monoolefins and diolefins (for example, α-chlorostyrene, α-bromostyrene, 2,5-dichlorostyrene, 2,5-dibromostyrene, 3,4-dichlorostyrene, ortho-, metha- and para-fluorostyrene, 2,6-dichlorostyrene, 3-fluoro-4-chlorostyrene, 3-chloro-4-fluorostyrene, 2,4,5-trichlorostyrene, dichloromonofluorostyrene, 2-chloropropene, 2,6-difluorostyrene, 2-chlorobutene, 2-chloropentene, 2-chlorohexene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylene, 1,2-dibromoethylene, 1,2-difluoroethylene, 1,2-diiodoethylene, chloroethylene(vinyl chloride), 1,1-dichloroethylene(vinylidene chloride), bromoethylene, fluoroethylene, iodoethylene, 1,1-dibromoethylene, 1,1-difluoroethylene, 1,1-diiodoethylene, 1,1,2-frifluoroethylene and chlorobutadiene), esters of organic and inorganic acids (for example, vinyl acetate, vinyl propionate, vinyl butylate, vinyl isobutylate, vinyl caproate, vinyl enanthate, vinyl benzoate, vinyl toluate, vinyl-p-chlorobenzoate, vinyl-o-chlorobenzoate, vinyl-p-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acryalte, heptyl acrylate, octyl acrylate, allyl chloride, allyl cyanide, allyl bromide, allyl fluoride, allyl iodide, allyl chloride carbonate, allyl nitrate, allyl thiocyanate, allyl acetate, acetate propionate, allyl butylate, allyl valeate, allyl caproate, metallyl chloride, metallyl cyanide, decyl-α-chloroacrylate, metyl-α-cyanoacrylate, ethyl-α-cyanoacrylate, amyl-α-cyanoacrylate, decyl-α-cyanoacrylate, dimethyl maleate, diethyl maleate, diallyl maleate, dimethyl fumarate, diethyl fumarate, dimetallyl fumarate and diethyl glutaconate), organic nitriles (for example, acrylonitrile, methacrylonitrile, ethacrylonitrile, 3-octenenitrile, crotonitrile and oleonitrile) and the like.

The above described monomer compounds are subjected to polymerization, for example radical polymerization, in a solvent which is inert to the polymerization. In the case of the radical polymerization, the usual radical initiators are suitably used. They include azobisisobutylonitrile, benzoyl peroxide, cumene hydroperoxide, tetramethylthiuram disulfide, 2,2'-azobis(4-methoxy-2,4-dimethylvaleronitrile), acetylcyclohexylsulfonyl peroxide, 2,2'-azobis(2,4-dimetylvaleronitrile) and the like. The initiators are generally used in a quantity of 0.1 to 10% by weight based on the total of the monomer compounds. The polymerization temperature is usually 20° to 200° C., preferably 80° to 150° C.

The solvent employed in the polymerization reaction is inert to the polymerization reaction, but includes hydrocarbons, ethers, ketones, esters, alcohols, amides, sulfoxides and the like. The solvent may be substituted with a group which is inert to the polymerization reaction.

In the polymerization, other additives, for example, a polymerization regulator and the like, may be added where needed.

In addition to the above described vinyl polymer, the resins employed in the coating composition of the present invention may be non-vinyl polymers, e.g. epoxy resins, polybutadiene resins, acrylic resins, alkyd resins, polyester resins, polyamide resins, polyether resins, fluorine resins, silicon resins or modified resins thereof. It is typical that the substituted acylamide group is introduced into the resin components by the substituted acylamide compounds (I), so that the substituted acylamide groups are introduced into the coating composition in the form of vinyl copolymer in many cases. On the other hand, the water dispersible or water soluble groups are introduced into resins which have been used in conventional water paints, rather that said vinyl copolymers. The proposed combination of the resins and components is a combination of (a) vinyl copolymers containing the substituted acylamide group and (b) other non-vinyl resins containing the active hydrogen-containing group and the water dispersible or water soluble groups. In this case, it is preferable that the value of the solubility parameter (SP) of the resins (a) is 9.5 to 13.5 $[cal/cm^3]^{\frac{1}{2}}$ and a difference between the resins (a) and the resins (b) in value of the SP is within 1.5.

It is desirable that the equivalence of the substituted acylamide group in the resin components used in the present invention is $1 \times 10^{-5}$ or more, preferably within the range of $1 \times 10^{-4}$ to $50 \times 10^{-4}$. The equivalence of the substituted acylamide group is expressed by the equivalence of the substituted acylamide group based on 1 g of all resin components. In the event that the equivalence of the substituted acylamide group is less than $1 \times 10^{-5}$, the paint can not be sufficiently cured. The number of the substituted acylamide groups in one molecule of the polymer is not limited, but preferably at least 6, more preferably at least 8. At least 6 substituted acylamide groups enhance curing ability at a low temperature and physical properties of coatings. Accordingly, a resin which is composed of a carbon-carbon main chain and at least 6 substituted acylamide groups pendanted thereto is more preferred. It is also desirable that the equivalence of the active hydrogen (expressed by the equivalence of the active hydrogen existing in all resin components of 1 g in the same manner as the above described equivalence of the substituted acylamide group) is $1 \times 10^{-5}$ or more, preferably within the range of $1 \times 10^{-4}$ to $50 \times 10^{-4}$. If the equivalence of the active hydrogen is less than $5 \times 10^{-5}$, the paint can not be sufficiently cured when baked. In addition, it is desirable that the equivalence of the water dispersible or water soluble groups existing in the resins is within the range of $1 \times 10^{-4}$ to $40 \times 10^{-4}$, preferably within the range of $3 \times 10^{-4}$ to $30 \times 10^{-4}$. In the event that the equivalence of the water dispersible or water soluble groups is less than $1 \times 10^{-4}$, the water dispersible or water solubility is poor. On the contrary, in the event that the equivalence of the dispersed-in water groups or the water-solubilized groups is higher than $40 \times 10^{-4}$, the hydrophilicity is too enhanced and a negative influence is exerted upon the water-proofness, weather resistance and other characteristics of the cured film.

The preparation of the above described resin, that is the limitation of the equivalences of the respective functional groups, has been known to the person skilled in the art and can be achieved by selecting the polymerization conditions, the modification conditions and other conditions. The number average molecular weight of the resins is a molecular weight which has been usually used for the paints and it is desirable that the number average molecular weight of the resins is for example 250 to 50,000, preferably 1,000 to 100,000, more preferably 1,000 to 50,000. If the number average molecular weight of the resins is out of the range, the cured film is poor in coating properties.

The coating composition according to the present invention can be used as a clear paint as it is. In addition, conventional anti-sagging agents, shedding-preventing agents, surface tension-regulating agents, antioxidants, photostabilizers, ultraviolet absorbents, setting preventing agents and the like may be added in accordance with the usual art of producing paints.

The aqueous dispersion coating composition according to the present invention is formed by dispersing the above mentioned components in an aqueous medium. Other solvents, for example alcohols, polyvalent alcohols, derivatives of polyvalent alcohols, hydrocarbons, ketones and ethers, may be added to the aqueous medium so far as the composition is stable.

The paint composition according to the present invention may be used for various kinds of uses for example as a final coating, intermediate coating, undercoating and the like, and maybe used as various kinds of paint, for example paints for automobiles, paints for household electric utensils and industrial paints.

In the curing reaction of the substituted acylamide compound, the substituted acylamide group is attacked by the active hydrogen containing compound, e.g. the hydroxyl group containing compound, and cured with the active hydrogen containing compound by means of a nucleophilic substitution reaction, as shown in the following reaction equation;

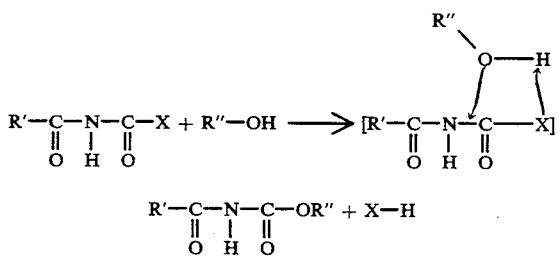

[wherein R' and R" represent alkyl groups and X represents the same as mentioned in the formula (1).]

As above described, the coating composition according to the present invention has the substituted acylamide group which is stable at ambient temperature. Since the substituted acylamide group is reacted with the active hydrogen atom at an elevated temperature, e.g.
80° to 160° C., by nucleophilic substitution reaction, the coating composition of the present invention is cured to form a cured film. The coating composition of the present invention shows an advantage in that the curing degree is constant within a certain temperature range, for example a range of 80° to 140° C., and thus the curing conditions can be very easily selected.

EXAMPLE

The present invention is in more detail described with reference to the preferred examples, but the present invention is not limited by these examples.

Synthesis of Polymer I (Polymers Having a Substituted Acylamide Group)

t-Butanol of 700 g, N-(t-butoxycarbonyl) methacrylamide of 100 g, styrene of 200 g and 2-ethylhexyl acrylate of 500 g were charged in a 3 liter four-necked flask equipped with a thermometer, a stirrer and a funnel and heated to be dissolved and the resulting solution is held at 100° C.

A solution of 2,2'-azobisisobutylonitrile of 10 g in xylene of 300 g was added dropwise to the above described solution in 3 hours and the polymerization was conducted at 100° C. with stirring. Then, the reaction mixture was aged for 2 hours to obtain a solution of the copolymer (I-a) containing nonvolatile ingredients in a quantity of 49.5% and having a number average molecular weight of 15,000.

Syntheses of I-B and I-D

A polymer was synthesized from monomers shown in Table-1 in the same manner as I-A. The number average molecular weight of the copolymer was regulated by a quantity of solvents and a quantity of catalysts.

Synthesis of Polymer II (Polymers Having Water Dispersible or Water Soluble Groups)

Synthesis of II-A

The synthesis was carried out in the same manner as I-A excepting that diethyleneglycol monomethyl ether was used in place of xylene, and styrene of 300 g, 2-ethylhexyl acrylate of 250 g, methyl methacrylate of 250 g, 2-hydroxyethyl methacrylate of 100 g and methacrylic acid of 100 g were used as the monomers to obtain a solution of the copolymer.

This copolymer contained nonvolatile ingredients in a quantity of 72.0% and had a number average molecular weight of 8,000. Further, diethanolamine of 100 g was added to this solution and the resulting mixture was uniformly dissolved followed by adding deionized water of 1,800 g to the resulting solution at 50° C. with slowly stirring to obtain a uniform aqueous solution of dispersed-in water resins containing nonvolatile ingredients in a quantity of 30%. The polymers having the water dispersible or water soluble groups are dispersed in water in the above described manner to be used in the form of an aqueous solution.

Synthesis of II-B

A polymer was synthesized from monomers shown in Table-1 in the same manner as II-A.

The quantity of nonvolatile ingredients and number average molecular weight of the copolymer shown in Table-1 were evaluated Before neutralization. The content of nonvolatile ingredients in the polymer (II-B) was set at 30% by regulating the quantity of deionized water.

Synthesis of Polymers III (Polymers Having a Substituted Acylamide Group and Water Dispersible or Water Soluble Groups)

Synthesis of III-A

A copolymer was obtained in the same manner as for I-A excepting that N-(t-butoxycarbonyl) methacrylamide of 300 g, styrene of 100 g, methyl methacrylate of 100 g, 2-ethylhexyl acrylate of 400 g and methacrylic acid of 100 g were used as the monomers.

This copolymer contained nonvolatile ingredients in a quantity of 49.0% and had a number average molecular weight of 15,000. Further, dimethylethanolamine of 100 g was added to this solution and the resulting mixture was uniformly dissolved followed by adding deionized water of 1,200 g to the resulting solution at 50° C. with slowly stirring to obtain a uniform aqueous solution of the water dispersible resins containing nonvolatile ingredients in a quantity of 30%.

Synthesis of III-B

A copolymer was obtained in the same manner as I-A excepting that N-[(2-methoxy)ethoxycarbonyl] methacrylamide of 50 g, styrene of 30 g, n-butyl acrylate of 80 g and methacrylic acid of 40 g were used as the monomers.

This solution of the copolymer was a transparent liquid containing nonvolatile ingredients in a quantity of 70% and having a number average molecular weight of 1,900.

Further, dimethylethanolamine of 40 g was added to the solution and the resulting mixture was uniformly dissolved followed by adding deionized water of 380 g to the resulting solution at 50° C. with slow stirring to obtain a uniform aqueous solution of the water dispersible resins containing nonvolatile ingredients in a quantity of 30%.

Synthesis of III-C

A copolymer was synthesized from monomers shown in Table-1 in the same manner as III-B.

The quantity of nonvolatile ingredients and number average molecular weight of the copolymer shown in Table-1 were evaluated before neutralization. The content of nonvolatile ingredients in the aqueous solution of the water dispersible resins was 30%.

Synthesis of Polymer IV (Polymers Having a Hydroxylic Group)

Synthesis of IV-A

Xylene of 2,000 g was charged in a 4 liter four-necked flask equipped with a thermometer, a stirrer and a funnel and held at a temperature of 120° C. Styrene of 300 g, methyl methacrylate of 300 g and 2-hydroxyethyl methacrylate of 200 g were uniformly mixed and further t-butyl-peroxy-2-ethyl hexanoate of 50 g was added to the resulting mixture to be dissolved. The resulting solution was added dropwise to xylene in 3 hours in an atmosphere of nitrogen and then the resulting mixture was polymerized at 120° C. Further, the reaction mixture was aged for 2 hours and xylene was removed from the reaction mixture to obtain a solution of the copolymer containing nonvolatile ingredients in a quantity of 71.5% and having a number average molecular weight of 3,000.

Synthesis of IV-B

A copolymer was obtained in the same manner as for IV-A. The quantity of solvents and the quantity of catalysts were regulated to obtain the results shown in Table-1 from the monomers shown in Table-1.

Examples 1 to 6

(Synthesis of pigment pastes)

In the event that, in the ingredients described in the column of pigment pastes in Table-2, vinyl polymers are solutions of water dispersible resins, they were diluted with deionized water and then preliminarily mixed followed by dispersing in a glass medium at room temperature for 40 minutes in the paint conditioner to obtain pigment pastes. In the case of other vinyl polymers, the dilution was carried out by the use of xylene.

(Preparation of coating compositions)

One vinyl polymer, another vinyl polymer and the pigment paste are mixed with stirring at room temperature to obtain a coating composition.

The respective coating compositions according to Examples 1 to 6 were diluted with deionized water to regulated the viscosity at 30 seconds as measured by means of the Ford cup #4. The resulting coating compositions were sprayed on a steel plate in accordance with the usual method and set for 5 minutes followed by baking for 15 minutes at 120° C. to obtain a three-dimensional cured film.

The pencil hardness and the solvent resistance of the respective compositions are shown in Table-2.

Production Example 1

(N-(2-ethylhexyloxycarbonyl) methacrylamide-styrene copolymer)

Styrene of 40 g and azobis(isobutylo)nitrile (AIBN) as a polymerization initiator of 2.5 g were added to a mixture of N-(2-ethylhexyloxycarbonyl) methacrylamide of 59.9 g (0.25 mol) and dioxane of 27.6 g. Subsequently, dioxane of 35 ml was put in a 300 ml four-necked flask equipped with a funnel, a reflux condenser, a thermometer and a stirrer as a polymerization reaction apparatus and the solution was heated to 80° C. with stirring. The solution of substituted methacrylamide, styrene and AIBN in dioxane was added dropwise to dioxane in the four-necked flask in 2 hours. After the completion of the addition of said solution, the reaction mixture was stirred for 1 hour and then a solution of AIBN of 0.5 g in dioxane was added followed by continuing the polymerization for 3 hours at 80° C. to obtain a solution of the copolymer containing nonvolatile ingredients in a quantity of 49% and having a number average molecular weight of 3,000 and the SP of 9.2.

Production Example 2

(N-(Ethoxycarbonyl) methacrylamide-styrene-methyl methacrylate copolymer)

Styrene of 3 g, methyl methacrylate (MMA) of 30 g and AIBN as the polymerization initiator of 2.5 g were added to a mixture of N-(ethoxycarbonyl)methacrylamide of 40 g (0.255 mol) and dioxane of 40 g. Subsequently, dioxane of 105 ml was put in the same polymerization reaction apparatus as in Production Example 1 and the solution was heated to 80° C. with stirring. The heated solution was polymerized in the same manner as in Production Example 1 to obtain a solution of the copolymer containing nonvolatile ingredients in a quantity of 40% and having a number average molecular weight of 4,500 and the SP of 10.8.

Production Example 3

(N-(Butoxycarbonyl) methacrylamidephenoxyethyloxyethyl acrylate (on the market as NK ester AMP-20 G made by Shin Nakamura Kagaku Kogyo KK) copolymer)

AMP-20 of 30 g and AIBN of 1.5 g were added to a mixture of N-(butoxycarbonyl) methacrylamide of 20.01 g (0.11 mol) and dioxane of 20 g. Subsequently, dioxane of 50 ml was put in the same polymerization reaction apparatus as in Production Example 1 and the solution was subjected to the polymerization reaction in the same manner as in Production Example 1 to obtain a solution of the copolymer containing nonvolatile ingredients in a quantity of 40% and having a number average molecular weight of 3,000 and the SP of 12.5.

Production Example 4

(N[2-(2-butoxyethoxy)ethoxycarbonyl] methacrylamide-phenoxypolyethylene glycol acrylate (on the market as NK ester AMP-60G made by Shin Nakamura Kagaku Kogyo KK) -methyl methacrylate (MMA) copolymer)

AMP-60 of 20 g, MMA of 20 g and AIBN of 2.5 g were added to a mixture of N-[2-(butoxyethoxy)ethoxycarbonyl] methacrylamide of 60 g (0.22 mol) and dioxane of 60 g. Subsequently, dioxane of 35 mol was put in the same polymerization reaction apparatus as in Production Example 1 and the solution was subjected the polymerization reaction in the same manner as in Production Example 1 to obtain a solution of the copolymer containing nonvolatile ingredients in a quantity of 50% and having a number average molecular weight of 2,000 and the SP of 12.4.

Production Example 5

(N-(ethoxycarbonyl) methacrylamide-styrene-methyl methacrylate (MMA) copolymer)

Styrene of 30 g, MMA of 30 g and AIBN as the polymerization initiator of 1.0 g were added to a mixture of N-(ethoxycarbonyl) methacrylamide of 20 g and dioxane of 20 g. Subsequently, dioxane of 190 ml was put in the same polymerization reaction apparatus as in Production Example 1 and the solution was subjected to the polymerization reaction in the same manner as in Production Example 1 to obtain a solution of the copolymer containing nonvolatile ingredients in a quantity of 30% and having a number average molecular weight of 25,000 and the SP of 10.8.

Production Example 6

(N-[2-(2-butoxyethoxy)ethoxycarbonyl] methacrylamide-(AMP-60)-methacrylate copolymer)

AMP-60 of 20 g, MMA of 20 g and AIBN of 1.0 g were added to a mixture of N-[2-(2-butoxyethoxy)ethoxycarbonyl] methacrylamide of 30 g and dioxane of 30 g. Subsequently, dioxane of 170 ml was put in the same polymerization reaction apparatus as in Production Example 1 and the solution was subjected to the polymerization reaction in the same manner as in Production Example 1 to obtain a solution of the copolymer containing nonvolatile ingredients in a quantity of 30% and having a number average molecular weight of 20,000 and the SP of 12.4.

Example 7

Maleated polybutadiene resin having the acid value of 40 and the base value of 150 of 120 g and the substituted methacrylamide group-containing resin, which has been obtained in Production Example 1, of 80 g (50 wt. % solution in dioxane) were put in a 2 liter four-necked flask equipped with a funnel, a reflux condenser, a thermometer and a stirrer to be mixed for 30 minutes at 50° C. Then, triethyl amine as the neutralizing agent of 4.34 g was added to the resulting mixture to carry out the neutralization with stirring for 10 minutes at room temperature. Subsequently, deionized water of 1,093 g was added in 30 minutes to prepare an aqueous dispersion containing solid ingredients in a quantity of 15%. Further, the electrodeposition was carried out for 3 minutes at 100 V and 30° C. with a coldrolled steel plate as an anode and stainless steel as a cathode and then the curing was carried out for 25 minutes at 120° C. to obtain a flat and smooth cured film having a pencil hardness of H and a film-thickness of 20μ.

Example 8

Carboxylic acid-modified epoxy resin having the acid value of 60 and the base value of 80 of 150 g and substituted methacrylamide group-containing resin (50 wt. %-solution in dioxane), which has been obtained in Production Example 1, of 100 g were put in the same reaction apparatus as in Example 7 and mixed for 30 minutes at 50° C. Then, triethyl amine as the neutralizing agent of 8.13 g was added to carry out the same operation in Example 7. Subsequently, deionized water of 1,317 g was added in 30 minutes to prepare an aqueous dispersion containing solid ingredients in a quantity of 15%. Further, the electrodeposition and the curing were carried out in the same manner as in Example 7 to obtain a flat and smooth cured film having a pencil hardness of H and a film thickness of 20μ.

Example 9

Acrylic resin having the acid value of 60 and the base value of 60 of 60 g, polyether resin having the base value of 60 of 30 g and substituted methacrylamide group-containing resin (40 wt. %-solution in dioxane), which has been obtained in Production Example 2, of 60 g were put in the same reaction apparatus as in Example 7 and mixed for 30 minutes at 50° C. Then, N,N-dimethylethanol amine as the neutralizing agent of 2.05 g was added to carry out the same operations as in Example 7. Subsequently, deionized water of 760 g was added in 30 minutes to prepare a dispersed-in water liquid containing solid ingredients in a quantity of 15%. Further, the electrodeposition and the curing were carried out in the same manner as in Example 7 to obtain a flat and smooth cured film having a film-thickness of 18μ and a pencil hardness of F.

TABLE 1

| | | Vinyl polymer | | | | | | | | | |
| --- | --- | --- | --- | --- | --- | --- | --- | --- | --- | --- | --- |
| | | I-A | I-B | I-D | II-A | II-B | III-A | III-B | III-C | IV-A | IV-B |
| Monomer | $M_1$[1] | 100 | | | | | 300 | | | | |
| | $M_2$[2] | | 30 | | | | | | 50 | 30 | |
| | $M_3$[3] | | | 70 | | | | | | | |

TABLE 1-continued

| | | Vinyl polymer | | | | | | | | | |
|---|---|---|---|---|---|---|---|---|---|---|---|
| | | I-A | I-B | I-D | II-A | II-B | III-A | III-B | III-C | IV-A | IV-B |
| | Styrene | 200 | 15 | 12 | 300 | 30 | 100 | 30 | 15 | 300 | 20 |
| | Methyl methacrylate | 200 | 10 | | 250 | 20 | 100 | | 10 | 300 | 20 |
| | 2-Ethylhexyl acrylate | 500 | 45 | 18 | 250 | 20 | 400 | | 30 | 200 | 30 |
| | n-Butyl acrylate | | | | | | | 80 | | | |
| | Methacrylic acid | | | | 100 | 10 | 100 | 40 | 10 | | 2 |
| | 2-Hydroxyethyl methacrylate | | | | 100 | 20 | | | 5 | 200 | 28 |
| Neutralizing agent | Dimethylethanol amine | | | 100 | 10 | 100 | 40 | | | | |
| Nonvolatile ingredients (%) | | 49.5 | 49.0 | 48.5 | 72.0 | 75.0 | 49.0 | 70.0 | 70.0 | 71.5 | 50.0 |
| Number average molecular weight | | 15,000 | 10,000 | 8,000 | 8,000 | 7,000 | 15,000 | 1,900 | 10,000 | 3,000 | 15,000 |

1):M$_1$: N-(t-butoxycarbonyl) methacrylamide
2):M$_2$: N-[(2-methoxy)ethoxycarbonyl] methacrylamide
3):M$_3$: N-[2-(2-butoxyethoxy)ethoxycarbonyl] methacrylamide

TABLE 2

| | Examples No. | | | | | |
|---|---|---|---|---|---|---|
| | 1 | 2 | 3 | 4 | 5 | 6 |
| Vinyl polymer | I-A | I-B | IV-A | IV-A | II-A | II-B |
| (weight) | (95) | (10) | (60) | (27) | (110) | (77) |
| Other vinyl polymer | II-A | II-A | III-A | III-B | III-A | III-C |
| (weight) | (40) | (180) | (55) | (140) | (85) | (120) |
| Pigment paste | | | | | | |
| Vinyl polymer | II-A | I-B | III-A | IV-A | II-A | II-B |
| (weight) | (70) | (40) | (70) | (28) | (70) | (70) |
| Pigment | Taipake R-930* | Taipake R-930 | Taipake R-930 | Taipake R-930 | Taipake R-930 | Taipake R-930 |
| (weight) | (50) | (50) | (50) | (50) | (50) | (50) |
| Pencil hardness | H | H | H | H | H | H |
| Solvent resistance | o | o | o | o | o | o |

*(white titanium oxide made by Ishihara Sangyo KK)

What is claimed is:

1. An aqueous coating composition comprising at least one kind of resin, wherein each of said resin(s) has at least one (1) hydroxyl group as an active hydrogen containing group, (2) substituted acylamide group represented by the formula

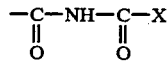

wherein X represents an alkoxy group, an amino group, an amide group, an iminooxy group, a sulfide group, or a mixture thereof, or (3) water-dispersible or water-soluble group selected from the group consisting of a carboxyl anion group, a sulfonic anion group, and a phosphoric anion group, wherein said coating composition contains all of the three functional groups in the resin(s) present therein,
wherein said active hydrogen of said hydroxyl group is present in the resin composition in an equivalence of $1 \times 10^{-5}$ or more based on 1 g of all resin components, and
wherein said water-dispersible or water-soluble group is present in the resin composition in an equivalence of $1 \times 10^{-4}$ to $40 \times 10^{-4}$ based on 1 g of all resin components.

2. The aqueous dispersion coating composition according to claim 1 wherein said resins are selected from the group consisting of epoxy resins, polybutadiene resins, acryl resins, polyester resin, polyamide resins, polyether resin, and silicone resins.

3. The aqueous dispersion coating composition according to claim 1 comprising
(a) a vinyl copolymer having a substituted acylamide group, and
(b) a vinyl or non-vinyl copolymer having a hydroxyl group and a water-dispersible or water soluble group.

4. The aqueous dispersion coating composition according to claim 3 wherein said non-vinyl polymer is selected from the group consisting of epoxy resins, polyester resin, polyamide resins, polyether resin, and silicone resin.

5. The aqueous dispersion coating composition according to claim 3 wherein said polymer (a) has a solubility parameter of 9.5 to 13.5 $[cal/cm^3]^{\frac{1}{2}}$ and the difference between the solubility parameter of said polymer (a) and polymer (b) is within 1.5.

6. The aqueous dispersion coating composition according to claim 3 comprising
(a') a vinyl compolymer which is composed of a carbon-carbon main chain and at least 6 substituted acylamide groups pendanted thereto, and
(b') a vinyl or non-vinyl ionic copolymer having a hydroxyl group.

7. The aqueous dispersion coating composition according to claim 1 wherein said substituted acylamide group is present in the resin composition in an equivalence of $1 \times 10^{-5}$ or more based on 1 g of all resin components.

8. The aqueous dispersion coating composition according to claim 1 wherein the number of said substituted acylamide groups in one molecule of the resins is at least 6.

* * * * *